(12) United States Patent
Kapochunas et al.

(10) Patent No.: US 7,707,164 B2
(45) Date of Patent: Apr. 27, 2010

(54) SYSTEM AND METHOD FOR DATA CLEANSING

(75) Inventors: Andrew Kapochunas, Oradell, NJ (US); Cynthia Bergelt, Mine Hill, NJ (US)

(73) Assignee: Dun & Bradstreet, Inc., Short Hills, NJ (US)

( * ) Notice: Subject to any disclaimer, the term of this patent is extended or adjusted under 35 U.S.C. 154(b) by 96 days.

(21) Appl. No.: 10/810,267

(22) Filed: Mar. 26, 2004

(65) Prior Publication Data
US 2004/0225543 A1 Nov. 11, 2004

(51) Int. Cl.
*G06F 17/30* (2006.01)

(52) U.S. Cl. .............................. 707/203; 707/3; 707/6; 707/101; 707/102; 707/103 Y

(58) Field of Classification Search ................ 707/101, 707/102, 103 X, 104.1, 204, 10, 6, 254, 3, 707/206, 103 Y; 705/1, 44, 400; 713/200, 713/161; 711/104; 379/201.02, 220.01
See application file for complete search history.

(56) References Cited

U.S. PATENT DOCUMENTS

| | | | | |
|---|---|---|---|---|
| 5,506,897 | A * | 4/1996 | Moore et al. ........... | 379/220.01 |
| 6,272,495 | B1 * | 8/2001 | Hetherington ............... | 707/101 |
| 6,311,178 | B1 * | 10/2001 | Bi et al. ......................... | 707/3 |
| 6,457,012 | B1 * | 9/2002 | Jatkowski ................... | 707/101 |
| 7,155,427 | B1 * | 12/2006 | Prothia et al. .................. | 707/3 |
| 2002/0059142 | A1 * | 5/2002 | Krause et al. ................. | 705/44 |
| 2002/0136381 | A1 * | 9/2002 | Shaffer et al. .......... | 379/201.02 |
| 2003/0088553 | A1 * | 5/2003 | Monteverde .................... | 707/3 |
| 2003/0093613 | A1 * | 5/2003 | Sherman ...................... | 711/104 |
| 2003/0191723 | A1 * | 10/2003 | Foretich et al. ............. | 705/400 |
| 2004/0093222 | A1 * | 5/2004 | Sipe et al. ....................... | 705/1 |
| 2004/0107205 | A1 * | 6/2004 | Burdick et al. .............. | 707/102 |
| 2004/0117358 | A1 * | 6/2004 | von Kaenel et al. ............ | 707/3 |
| 2004/0123101 | A1 * | 6/2004 | Rineer et al. ................ | 713/161 |
| 2004/0133443 | A1 * | 7/2004 | Payne et al. .................... | 705/1 |
| 2004/0153663 | A1 * | 8/2004 | Clark et al. ................. | 713/200 |

FOREIGN PATENT DOCUMENTS

| WO | WO 01/29780 | 4/2001 |
|---|---|---|
| WO | WO 02/077769 | 10/2002 |

OTHER PUBLICATIONS

Search Report dated Jul. 4, 2008 corresponding to European Patent Application No. 04758374.5.
XP-002142880; "Information Based Indicia Program Host System Specification"(Draft); The United States Postal Service; Oct. 9, 1996; 42 pp.
XP-002284896; "Data Cleaning: Problems and Current Approaches"; Erhard Rahm and Hong Hai Do; University of Leipzig, Germany; Dec. 2000; 11 pp.

* cited by examiner

*Primary Examiner*—Thuy N Pardo
(74) *Attorney, Agent, or Firm*—Ohlandt, Greeley, Ruggiero & Perle, L.L.P.

(57) ABSTRACT

A business information service provides data cleansing to correct and update both domestic and global addresses. A combination of processes generate cleansed data for input into a matching process. The matching process matches information about a business, including the address, to a unique business identifier in at least one database of business information. The matching process is more successful with more standard and accurate input addresses.

13 Claims, 6 Drawing Sheets

SYSTEM AND METHOD FOR DATA CLEANSING

BACKGROUND OF THE INVENTION

1. Field of the Invention

The present invention relates to providing a business information service, and more particularly, to cleansing data associated with customer lists.

2. Description of the Related Art

Some potential business information service users have customer data that is not functioning at the maximum possible efficiency. This is because some critical data is missing, some addresses are wrong, and some of the customers have moved. These problems can affect internal databases preventing accurate identification of a customer coming in from a telecenter, mailroom, or website, leading to a creation of duplicates and possible mishandling the customer relationship. Response rates to mailed promotions may weaken as fewer customers actually receive them. There is a need for a business information service that cleanses data to provide accurate customer addresses.

Some services provide a mish-mash of many, often conflicting suggested changes for each address element. This makes leveraging corrections very difficult. There is a need for an output of a single best correction for each address element.

BRIEF SUMMARY OF THE INVENTION

The present invention is directed to a system and method for data cleansing that meets these and other needs.

One aspect is a method for data cleansing. At least one input address is received. The input address is compared to at least one standard and a single best address corresponding to the input address is provided based on the comparison. In some embodiments, the single best address is matched to a database having unique business identifiers associated with addresses to find a matching address, which is provided. In some embodiments, the database is an advanced office system (AOS). In some embodiments, a match project analysis report is provided. In some embodiments, the input address is converted to a predetermined record layout, before comparing it to the standard. In some embodiments, the input address is associated with at least one code that is used to determine the single best address. In some embodiments, the input address is associated with at least one score that is used to determine the single best address. In some embodiments, the standard is at least one of the following: ZIP+4 coding, coding accuracy support system (CASS), Locatable Address Conversion System (LACS), delivery sequence file (DSF), and National Change of Address (NCOA). In some embodiments, a report is provided. In some embodiments, the report is a postal summary report or a pre-audit report. In some embodiments, at least one status notification is sent to the user, who supplied the input address.

Another aspect is a system for data cleansing comprising a pre-auditor, a verifier, a vendor interface, and a user interface. The pre-auditor is for generating a report having a number of views of an input address file, which contains a plurality of addresses. The verifier is for finding and removing any invalid records from the input address file. The vendor interface is for sending the input address file and an order to at least one vendor and for receiving an output file from the vendor(s). The user interface is for providing a single best address for each address in the input address file. In some embodiments, the system includes a matcher for attempting to match any address in the output file or the invalid records to a matching address in a database that contains unique business identifiers associated with addresses. In some embodiments, the system includes an investigator for investigating any address not matched, upon request. In some embodiments, the pre-auditor calculates a plurality of counts associated with the input address file. In some embodiments, the input address file includes a plurality of records and each record includes a plurality of fields. In some embodiments, the counts are at least one of the following: a number of distinct values by field, a missing field count, a total number of records, or a percent of distinct values. In some embodiments, the views are one of the following: alphabetical, most frequent content, and alpha characters only. In some embodiments, the vendor standardizes addresses using one of the following: Locatable Address Conversion System (LACS), delivery sequence file (DSF), and National Change of Address (NCOA).

Another aspect is a machine readable medium having instructions stored thereon to perform a method for data cleansing. A machine readable medium is any storage medium, such as a compact disk (CD). At least one input address is received. The input address is compared to at least one standard and a single best address corresponding to the input address is provided based on that comparison. In some embodiments, the single best address is matched to a database having unique business identifiers associated with addresses to find a matching address and a matching address is provided.

These and other features, aspects, and advantages of the present invention will become better understood with reference to the drawings, description, and claims.

DETAILED DESCRIPTION OF THE INVENTION

Figure 1A:
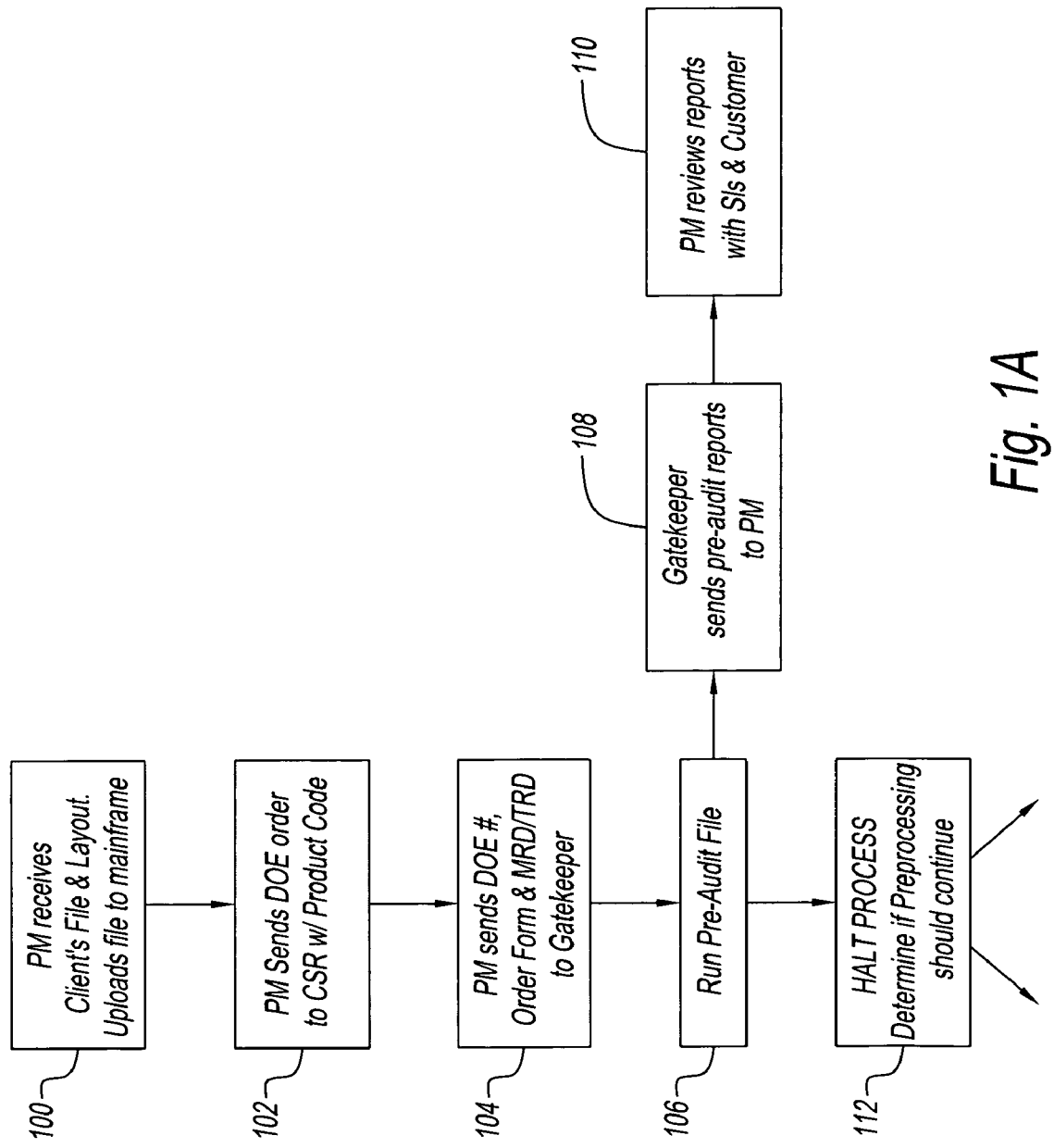
FIGS. 1A and 1B are logic flow diagrams of an example method of data cleansing.
Figure 1B:
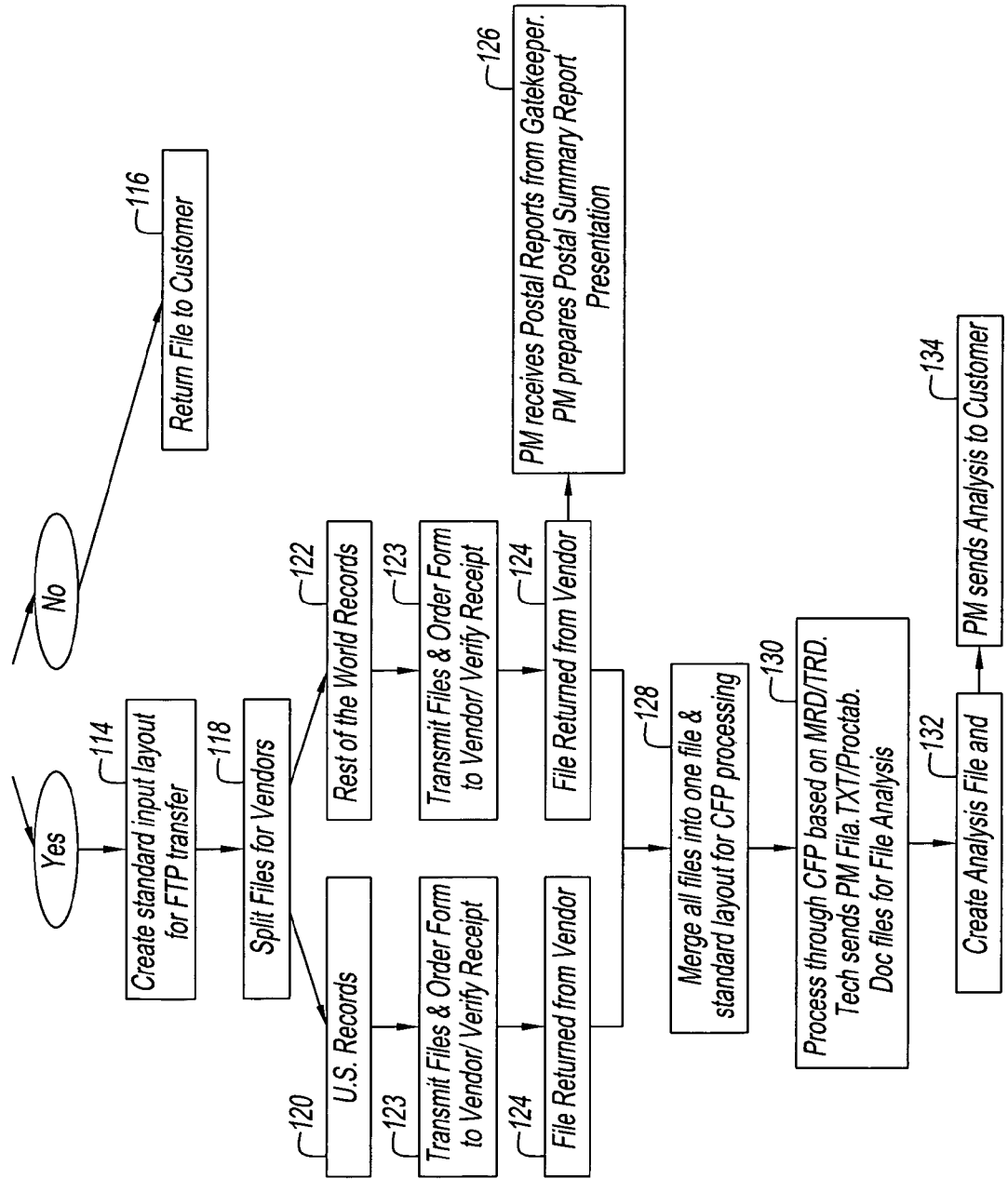

FIGS. 1A and 1B show an example method of data cleansing. In step 100, a project manager receives a user input file and file layout and uploads the file to a processor, such as a mainframe. In step 102, the project manager sends an order with a product code to a vendor. In step 104, the project manager sends the order form and other information to a gatekeeper. In step 106, a pre-audit is performed. If there is no critical error discovered by the pre-audit, then in step 108 the gatekeeper sends a pre-audit report to the project manager. In step 110, the project manager reviews the report with the user and others. In step 106, if there is an error discovered by the pre-audit, then in step 112, the process is halted to determine if processing is to continue. If the process is halted, then in step 114, a standard input layout for file transfer is created. If the process is not halted, then in step 116, the file is returned to the user. In step 118, files are split for vendors into domestic records 120 and foreign records 122, which are processed separately. In step 123, files and an order form are sent to a vendor, who verifies receipt of them. In step 124, files returned from the vendor are received. In step 126, when files are returned for foreign records, the project manager receives postal reports from the gatekeeper and prepares a postal summary report. In step 128, domestic and foreign files are merged into one file with a standard layout for processing. In step 130, files are processed and a technician sends the project manager files for analysis. In step 132, an analysis file is created and in step 134, the project manager send the analysis to the user.

Figure 2:
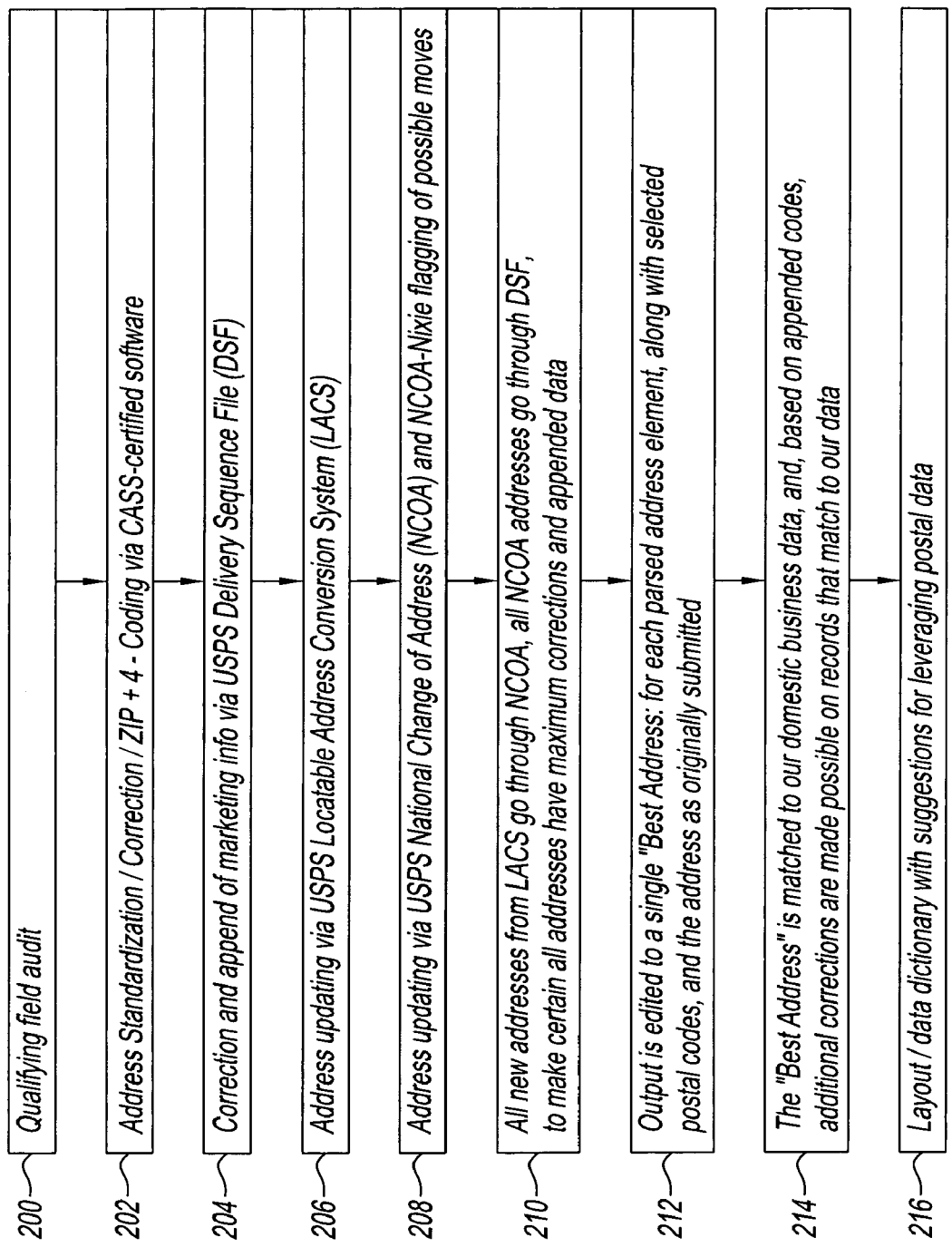
FIG. 2 is a logic flow diagram of another example method for data cleansing.

FIG. 2 shows an example method for data cleansing. In step 200, a qualifying field audit is performed. In step 202, addresses are standardized, corrected, and ZIP+4-coded. In step 204, addresses are additionally corrected, and marketing-oriented information is appended. In steps 206 and 208, addresses are updated with changed information, when appropriate. In step 210, new addresses are re-processed to verify corrections and add categorization data. In step 212, output is edited to a single best address for each parsed data element along with selected postal codes and the original address. In step 214, the best address is matched to a business information database and, based on appended codes, additional corrections are made available. In step 216, a layout data dictionary with suggestions for leveraging postal data is generated. In general, the example method includes processing domestic addresses including data discovery, postal pre-processing, and, optionally, matching.

Data discovery begins with the pre-audit and includes parsing and reformatting a customer file and verifying that a large number, such as 85% of the records in the customer file have enough address elements to be helped by postal pre-processing. It is verified that there is one address per record. Variations of an address on a single record, i.e., a bill-to and a ship-to, or a street address and a P.O. Box, need to be "exploded" into separate records to be helped by postal processing. It is verified that the data is for the United States only. Different processes are used for foreign data. The pre-audit also includes examining the contents of every field in every record, and a report is produced, which applies letter grades to each data element, reflecting completeness and relevance.

In step 202, postal pre-processing is performed through a combination of processes and matching to multiple USPS-compiled database, such as a database totaling over 280 million domestic records, for corrections. Standardization, correction, and ZIP+4 coding (a/k/a Coding Accuracy Support System, CASS™, processing) are performed for all domestic addresses, business or consumer.

In step 204, postal pre-processing in this method also includes applying a file to correct records and append codes, such as "good address, but vacant for the last 90 days" and score each record for accuracy and deliverability. One example file is a second generation delivery sequence file (DSF2). The DSF2 is a file containing substantially all valid addresses serviced by the Postal Service. This comprehensive system enables the substantial elimination of undeliverable addresses, allows mailers to obtain additional postage discounts, and provides valuable information about the make-up of addresses on files. The DSF2 is updated monthly with transactions supplied by the USPS and has 156 million address records for nearly every deliverable address in the United States.

In step 206, postal pre-processing also includes utilizing address standardization and DSF2 corrections to match to another file, such as the Locatable Address Conversion System (LACS) file. LACS is a file made available by the United States Postal Service (USPS) that provides access to new, changed addresses for locations that have not moved. The LACS has about 5 million records. The vendor receives monthly updates to the USPS LACS file.

Using data that has already been standardized and corrected increases the match rate to the LACS file. The LACS file has addresses changed by the United States Postal Service (USPS) either when a community chooses to provide 911 service, which requires a building number and street address rather than a rural route box location, or when a street name has been changed.

In step 208, postal pre-processing also includes utilization of corrected and updated addresses from the preceding steps to match to another file, such as the weekly updated 120-million-record National Change of Address (NCOA) file.

The NCOA file is made available by the USPS to provide mailers current change of address information so as to reduce undeliverable mail and increase response rates. This comprehensive system identifies and corrects addressing errors before mail enters the mail stream. A vendor receives updates to the NCOA file every week. NCOA covers four years of moves, with additional possible moves (on near matches to a "from" address) flagged via NCOA-Nixie footnotes. The NCOA has about 120 million records in a rolling four-year database of from- and to-addresses, requiring an almost perfect match to the old name and address to get a new address appended. The NCOA-Nixie flags include a reason code why a new address could not be appended.

In step 210, new addresses generated from NCOA are then reprocessed: first against LACS and then against DSF2. New addresses coming from LACS that were also not NCOA matches are reprocessed against DSF2.

In step 212, postal pre-processing results in a set of best address corrections or address updates for each address element. The best address corrections or address updates are appended to the input address, avoiding the creation of a file with multiple and conflicting sets of corrections for each address element as is the common practice from conventional processes.

In step 214, the results are matched to another file, such as a 31-million-record advanced office system (AOS) file. A certain number of postal processed records have either failed to be recognized by postal processing, or failed to be completely corrected. For instance, records with missing or wrong suite numbers. Historically, matches, at some level of confidence, are made for 30% to 95% of the records that postal processing determines to be uncorrectable. If such a record is matched to a database, (allowing for a lower confidence match is normally acceptable, because it is already known that the client address is incorrect) and if the user agrees the match is valid, the user has the option to further correct the record by using address elements from the matched record in the database.

An example method of data cleansing provides address correcting and updating service for domestic and global address records using a combination of processes. The domestic method includes the following steps: (1) in step 200, performing a qualifying field audit; (2) in step 202, standardizing, correcting, and ZIP+4 coding address records via CASS-certified software; (3) in step 204, correcting and appending marketing information via DSF; (4) in step 206, updating the address records via USPS LACS; (5) in step 208, updating the address records via USPS NCOA and NCOA-Nixie flagging of possible moves; (6) in step 210, applying NCOA for new addresses from LACS, and applying DSF to NCOA addresses, to make certain all addresses have maximum corrections and appended data; (7) in step 212, editing output to a single best address for each parsed address element, along with selected postal codes, and the address as originally submitted; (8) in step 214, matching the best address to a domestic business database, and, based on appended codes, making additional corrections on records that match to the database; and (9) in step 216, providing a layout or data dictionary with suggestions for leveraging postal data. A project manager initiates a field by field audit and a multi-step standardization, correction, and updating process, preferably in three days or less.

Data cleansing includes applying a decision tree to derive a domestic best address. The highest priority is addresses with a positive match to the NCOA file. NCOA-generated addresses are re-processed through address standardization, DSF, and LACS to ensure validity, but are still called NCOA addresses and have an appended move date. An NCOA address, when it is a brand new street, for instance, can be a street name not yet on the DSF file. In such cases the NCOA address stands and is delivered as the best address. The next priority is new addresses gained through LACS that do not match to NCOA. Addresses would be DSF processed on a second pass to validate. The next priority is addresses cleansed through DSF that do not match NCOA or LACS. The next priority is addresses that match address standardization, but not DSF. The last priority is addresses failing to match address standardization. These addresses are parsed and are used to populate the best address fields.

Data cleansing for foreign addresses includes a project manager initiating an audit and then reformatting, correcting, standardizing and appending a single set of best addresses to an original record or records. Preferably, software containing the best available global postal agency information is used.

The global method includes the following steps: (1) performing a qualifying field audit; (2) parsing, reformatting, and correcting city, state/county/prefecture and country names and properly formatting postal codes; (3) applying global postal standardization and correction software; (4) coding output records; (5) appending a single best address for each parsed address element to the address as originally submitted; (6) matching the best address to at least one business database, and, based on appended codes, optionally making additional corrections on records that match to the records in the database. An example of record coding for step (4) is: valid as submitted, corrected, valid after corrections, possibly deliverable; not standardizable or correctable, but appears to have all required address elements for a specific country, possibly because that country does not provide address information that would enable verification/correction, or probably undeliverable, either because two or more critical address elements are missing or because the address has an uncorrectable, pre-unification, German postal code.

Another example method for data cleansing includes receiving a file, such as a flat file on a CD, cartridge, email, etc. An audit is performed on the file to verify that name and address fields are adequately populated. If so, domestic or global processing is performed for postal processing and address correction and standardization. Preferably, the domestic or global processing is performed by a vendor. The result is one best address for a given input address. Then, the best address is matched to a database of business information.

Figure 3:
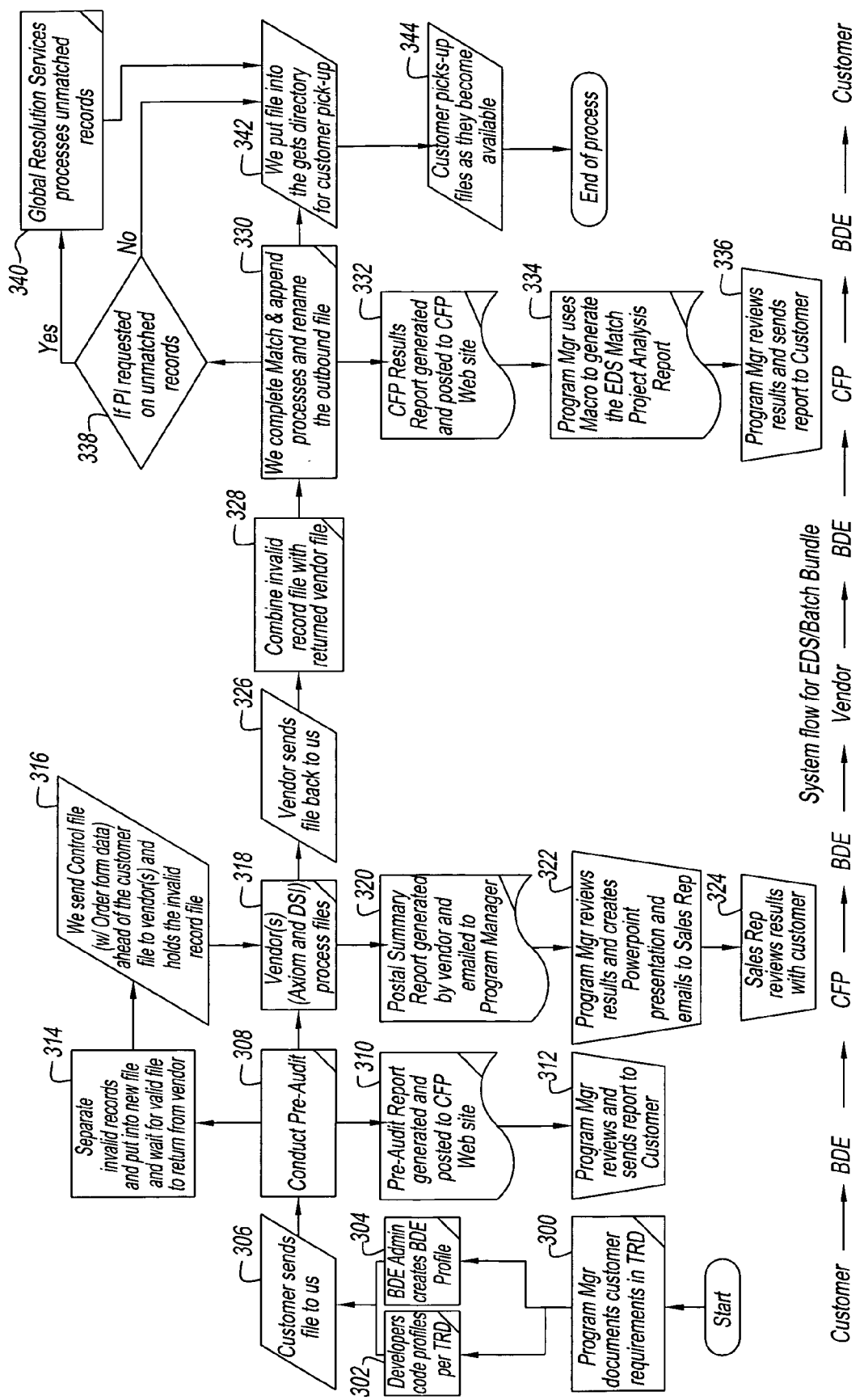
FIG. 3 is a logic flow diagram of the operation of an example system for data cleansing.

FIG. 3 shows the operation of an example system for data cleansing. In step 300, the program manager documents user requirements. In steps 302 and 304, profiles are created based on user-defined requirements. In step 306, a user input file is received. In step 308, a pre-audit is performed. In step 310, a pre-audit report is generated and made available to others, such as by posting to a website. In step 312, the program manager reviews and sends the report to the user. In step 314, invalid records are separated and put into a separate file, which will be appended to the valid file received from a vendor in step 328. In step 316, an order form and other information is sent to the vendor in a separate file, ahead of the data file. In step 318, the vendor processes the information. In step 320, a postal summary report is generated by the vendor and received by the program manager. In step 322, the program manager reviews the results, creates a summary presentation and shares them with others. In step 324, the user reviews the results. In step 326, the file is received from the vendor. In step 328, the invalid record file (from step 314) is combined with the returned vendor file. In step 330, matching and appending is performed. In step 332, a results report is generated and made available to others. In step 334, the program manager generates a project analysis report. In step 336, the program manager reviews the results and sends them to the user. In step 338, it is determined whether an investigation is requested for unmatched records. If so, in step 340, the unmatched records are processed. In step 342, additional results are made available to the user. In step 344, the user receives results as they become available.

In general, the example system receives user input addresses, processes them, and provides a file having updated addresses, a postal processing summary report, a match project analysis report, and a pre-audit report. The system is preferably capable of handling about 250,000 records sent monthly by about 400 users. Preferably, the system provides output in 72 hours or less for domestic addresses and 10 days or less for foreign addresses. The system tracks the status of processed data throughout the process. The system sends notifications to the user, e.g., email messages, at various points in the process, such as upon receipt of an input file or when an error occurs. These notification emails are sent to internal and external customers, whenever there is activity on accounts that they are monitoring. Input files may be in any format and may be encrypted or compressed. The system provides a recommended but not required layout to the user. Preferably, users separate domestic and global addresses. Input files may include unique business identifiers, such as DUNS numbers, that correspond to identifiers in the matching databases. An input file is transmittable to the system through the Internet or a leased line. Preferably, batch processes are used to transfer input files.

When the user attempts to login to the system, they are prompted for a user ID and password. Successful login brings the customer to the root of their directory structure. From the root directory the customer has an option to change directories to their puts (deposit files), or their gets (retrieve files) directory.

The example system decompresses the file, if it has been compressed, decrypts the file, if it has been encrypted with PGP, and scans the file for viruses. Then the system sends a file accepted email to the user. The system then pushes the file to an appropriate downstream application and sends a notification of new request email (e.g., file has been submitted) to the user. A downstream application is an internal application to which an inbound file is dispatched, or the internal application from which outbound file processing originates. A viewable status file is selectable by the user. A process to automate file retrieval is also available to the user. Example status files include a filename, profile ID, tracking ID and status code and the like.

The input file is processed to have a predefined record layout, such as the one shown in Table 1 below.

TABLE 1

Example record layout

|  | Start | End | Length |
|---|---|---|---|
| ContactFirstName | 1 | 20 | 20 |
| ContactMiddleName | 21 | 40 | 20 |
| ContactLastName | 41 | 60 | 20 |
| AddressLine1 | 61 | 124 | 64 |
| AddressLine2 | 125 | 188 | 64 |
| AddressLine3 | 189 | 252 | 64 |
| AddressLine4 | 253 | 316 | 64 |
| City | 317 | 380 | 64 |
| State | 381 | 400 | 20 |
| PostalCode | 401 | 410 | 10 |
| CountryName | 411 | 430 | 20 |
| Business Name | 431 | 550 | 120 |
| Phone # | 551 | 565 | 15 |
| DUNS # | 566 | 574 | 9 |
| Filler | 575 | 584 | 10 |
| Our Sequence # | 585 | 591 | 7 |
| Our Sub-sequence # | 592 | 592 | 1 |
| 'I' Indicator | 593 | 593 | 1 |

The example system includes a pre-auditor, verifies various aspects of the input addresses, and calculates frequency counts for various fields in the records, such as company name, address 1, address 2, address 3, address 4, city, state, ZIP and country name. The pre-auditor calculates a number of times one of these fields is repeated, and absence counts, presence counts, number of records and the percentage distinct within each field.

The pre-auditor generates a report including various views of the data, such as all counts, as alphabetical, most frequent content, or alpha characters only.

The pre-auditor generates an all-counts view of the data. For each field in the records, counts are calculated, such as a number of distinct values by field for all records (# of unique values by field), an absence count (number of records missing content for specified field), presence count (number of records populated with content for specified field), number of records (total number of records in the file), percent distinct (percent of distinct values compared to total of records in file (percent=number of distinct values/number of records in the file). The total number of records also equals the total of absence and presence counts. For example, examining the company name field for a file yields the following: the file contains 1,000 records for the company field, 850 records are distinct values, 100 records are absent, and 900 records are present.

The pre-auditor generates an alphabetical view of the data. For each field in the record, the pre-auditor shows a predetermined number, such as 50, of the first occurrences of information within the field sorted alphabetically, preferably in ascending order. For each unique field content, the pre-auditor determines a number count of duplicates, displays the first predetermined number of occurrences by occurrence name, determines the number of duplicates, determines the percentage of occurrences compared to a total number of records in the input file, and determines a number of occurrences for particular fields per the number of total records in the input file. An example is shown in Table 2 below.

TABLE 2

Alphabetical view

| Specified Field (i.e. Company Name) | Count (Occurrences) | Percentage of file that has occurrence |
|---|---|---|
| Sort alphabetically in ascending order. Content of specified field | How many times the (Company Name) occurs in the file | Percentage of occurrences compared to total # of records in file (% = # of occurrences/# of total records in file) |
| Example: A&A Investment Network Inc DBA Sub | Example: 3 (Company Name occurs three times in file) | Example: 0.01% (Company name makes up 0.01% of file) |

The pre-auditor generates most frequent content view of the data. For each field in the input records, a predetermined number, such as 50, of the highest frequencies or occurrences within the field is determined. For each unique field content, the pre-auditor determines a number of duplicates and displays the first predetermined number of occurrences of most repetitive field content that occurs in the file, giving occurrence name, number of duplicates, and percent of occurrences compared to the total number of records in the file. An example is shown in Table 3 below.

TABLE 3

Most frequent content view

| Specified Field (i.e. Company Name) | Count | Percentage of file that hasoccurrence |
|---|---|---|
| Content of specified field (i.e. Company Names) | Sorted in descending order according to the highest occurrence on the file, how many times does the (Company Name) occur in the file | Percentage of occurrences compared to total # of records in file (% = # of occurrences/# of records in file) |
| Example: Edward A Kaplan DBA Edward A Kaplan | Example: 40 (Occurs 40 times in file) | Example: 0.12% (This company name makes up 0.12% of file) |

The pre-auditor generates an alpha characters only view of the data. For each of the fields, the pre-auditor displays a predetermined number, such as 50, of the highest frequencies or occurrences of records containing non-numeric, alpha-numeric characters within a specified field (i.e., A-Z, 1-9 and a blank space). Unacceptable occurrences include more than 1 occurrence of anything other than alpha-numeric characters. For each unique field, content with alphas only includes a count of the number of duplicates, the first predetermined number of occurrences, the occurrence name, the number of duplicates, and the percent of occurrences compared to total number of records in the file. An example is shown in Table 4 below.

TABLE 4

Alpha characters only view

| Specified Field (i.e. Company Name) | Count | Percentage of file that has occurrence |
|---|---|---|
| Content of specified field (Company | Sorted in descending order according to the highest occurrence of special or | Percentage of occurrences compared to total # of records in file (% = # of |

TABLE 4-continued

Alpha characters only view

| Specified Field (i.e. Company Name) | Count | Percentage of file that has occurrence |
|---|---|---|
| Name) | non-printable characters in the file, how many times does the (Company Name) occur in the file | occurrences/# of records in file) |
| Example: Edward A Kaplan DBA Edward A Kaplan | 40 (Occurs 40 times in file) | 42.39% (This company name makes up 42.39% of file) |

The example system removes any invalid records from the input file and stores them in a new file. An invalid indicator with indicators, such as "I" for invalid or "V" for valid are added to the record. This file is not processed, but rather held until the rest of the input file is processed and then combined with results file and sent to a matching process.

There are various rules for determining invalid records. For example, for domestic records, valid combinations include: address 1 and city and state, address 1 and ZIP, address 2 and city and state, address 2 and ZIP, address 3 and city and state, address 3 and ZIP, address 4 and city and state, address 4 and ZIP. If no street address is present, address_1, address_2, address_3, and address_4 are checked. If addresses 1, 2, 3 and 4 are blank, the record is ineligible. The record is ineligible if address_1, address_2, address_3 or address_4 is present, but there is no ZIP code or city/state combination. For domestic records, invalid combinations include: no address present, address 1 and city (no ZIP, no state), address 2 and city (no ZIP, no state), address 3 and city (no ZIP, no state), address 4 and city (no ZIP, no state), address 1 and state (no ZIP, no city), address 2 and state (no ZIP, no city), address 3 and state (no ZIP, no city), and address 4 and state (no ZIP, no city).

The example system includes a vendor order form processor. In an example manual process, a program manager completes an order form for each input file. In an example automated system, the information on the order form is provided to a technician, who verifies the information. This information is sent to a vendor in a control file and is received prior to the data file. Both vendors use the same control file layout. This information is also used to send a vendor postal summary report to the program and to generate a bill for files processed.

The example system includes an example user interface including a template of the information sent to the vendors. The program manager and customer define profile needs and order form information. A profile is a set of characteristics and specifications for customer file transfers as defined by administrator entries into the user's account through an administrative interface. An administrative interface is a user interface for accessing a system for viewing, monitoring, and managing user accounts and profiles. The order form is automatically captured and electronically communicated to the vendors. An example order form is shown in Table 5 below.

TABLE 5

Example order form

| Field Name | Required? | Read Only? | Source |
|---|---|---|---|
| Contract ID (free form) | Y | | Program Manager |
| Our Contact Name | Y | | Program Manager |
| Our Phone | Y | | Program Manager |
| Our Email | Y | | Program Manager |
| File Quantity | Y | | Calculated (based on initial number of records from BDE) |
| Multiple File indicator | Y | | Program Manager |
| Vendor Needs: (Only DSI will be using this data but it will appear on Axiom's) Maintain Diacritics Reject USA Records Canadian NCOA | Y | | Defaults are: Maintain Diacritics = No Reject USA Records = Yes Canadian NCOA = No |

The example system includes a file transfer protocol (FTP) program. Files are sent to the vendor upon receipt. Preferably, the files arrive individually in order for the vendors to process the post summary report for each job and send the post summary report to the program manager. Bundling multiple files is also an option.

The example system including completing the pre-audit, creation of a control file, and creation of an input file for each vendor. An example layout of the input file is shown in Table 6 below.

TABLE 6

Example layout of input file

| | Start | End | Length |
|---|---|---|---|
| ContactFirstName | 1 | 20 | 20 |
| ContactMiddleName | 21 | 40 | 20 |
| ContactLastName | 41 | 60 | 20 |
| AddressLine1 | 61 | 124 | 64 |
| AddressLine2 | 125 | 188 | 64 |
| AddressLine3 | 189 | 252 | 64 |
| AddressLine4 | 253 | 316 | 64 |
| City | 317 | 380 | 64 |
| State | 381 | 400 | 20 |
| PostalCode | 401 | 410 | 10 |
| CountryName | 411 | 430 | 20 |
| Business Name | 431 | 550 | 120 |
| Phone # | 551 | 565 | 15 |
| DUNS # | 566 | 574 | 9 |
| Filler | 575 | 584 | 10 |
| OurSequence # | 585 | 591 | 7 |
| Our Sub-sequence # | 592 | 592 | 1 |
| I' Indicator | 593 | 593 | 1 |

The example system includes a vendor output file receiver. The output file receiver sends a notification of receipt.

The example system includes a vendor-to-user linker. An incoming file from a user is linked to a vendor. When an output file is received from the vendor, the linker returns the output file to the user. Vendor files are combined with the invalid record file from the pre-audit process. This file includes raw user input data and postal pre-processed data or the user data and no postal pre-processed data for invalid records. The valid and invalid records are combined and a single file is sent to the matcher.

The example system includes a matcher. The following fields are mapped: the original company name from the user, address from the vendors, and original phone number from the user. If the addresses are blank, then the original user address is used. If address information from a vendor is blank, then the matcher matches against the original customer address information.

The example system includes a project creator. A match technician creates a new project, renames an output file and uses new or original customer address information to perform matching. Users send a second file using a different profile in a batch file. A file is received from a vendor and matching is performed per profile instructions. Resulting matched records are sent to an appended file in the example system and unmatched records are sent to an investigator in the example system, if requested by the user.

The example system includes external interfaces. Files are sent and received from vendors. The system sends the original customer address to a vendor. The vendor sends the best corrected address back along with the original customer address and postal code information. Preferably, standard input and output layouts are used.

Figure 4:
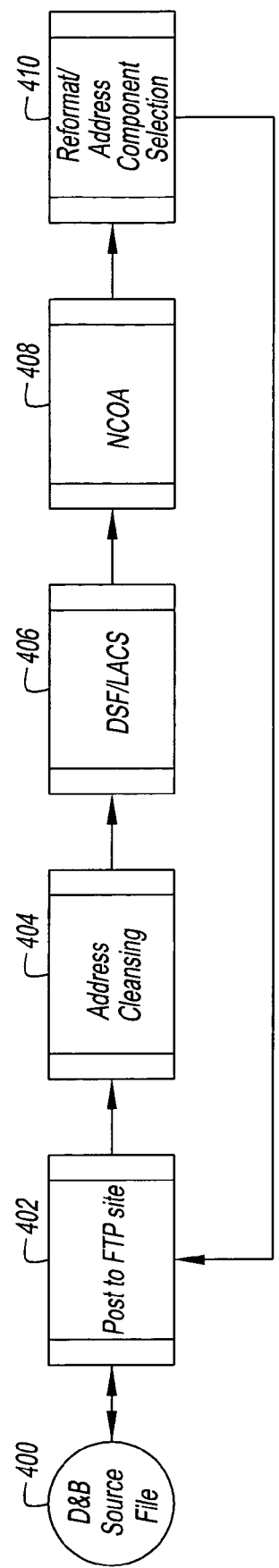
FIG. 4 is a logic flow diagram of an example vendor domestic address cleansing system.

FIG. 4 shows an example vendor domestic address cleansing system that standardizes addresses according to USPS specifications. In step 400, a source file is posted to an FTP site 402, address cleansing is performed 404, DSF and LACS processing is performed 406, and NCOA processing is performed 408, and addresses are reformatted and components are selected 410.

The system enhances the user's data by verifying and correcting 5-digit ZIP codes, applying ZIP+4, delivery point barcodes, carrier route codes, and line of travel data. The system also ensures a CASS-certified output. CASS is the USPS certification process for address standardization products, which is updated and re-certified annually.

The vendor address cleansing system has a reformat address component selection. This component reformats output records to comply with the standard output layout. The process also ensures that the optimum address components are selected from DSF/LACS/NCOA based on priorities set by the vendor.

Figure 5:
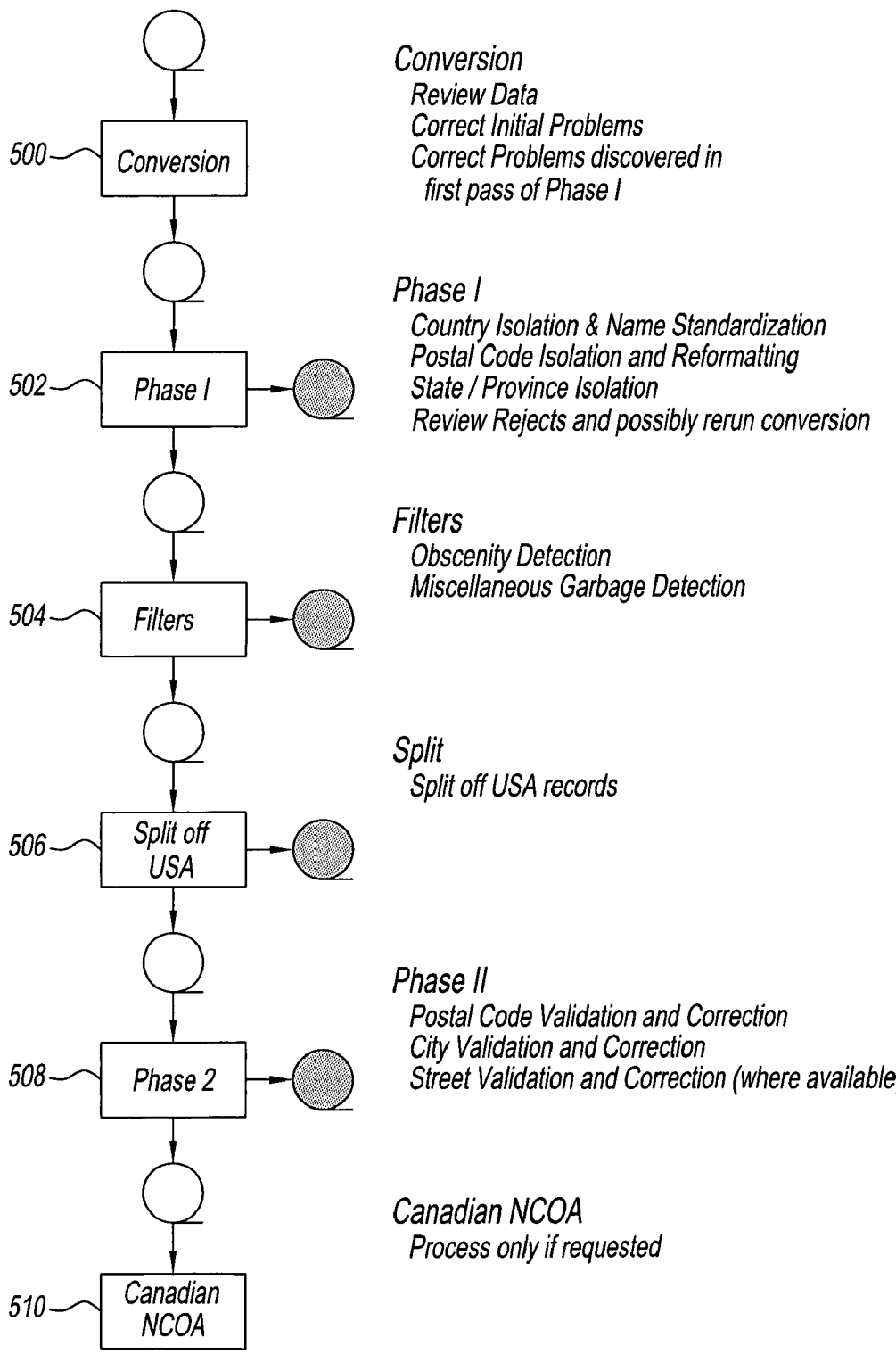
FIG. 5 is a logic flow diagram of an example vendor international hygiene system.

FIG. 5 shows an example vendor international hygiene system. In step 500, conversion is performed to review data, correct initial problems, and correct problems discovered in a first pass of phase one. In step 502, phase one is performed, including country isolation and name standardization, postal code isolation and reformatting, state or province isolation, review of rejects and possibly rerun the conversion. In step 504, filters are applied for obscenity detection and miscellaneous garbage detection. In step 506, domestic records are split off. In step 508, phase two is performed, including postal code validation and correction, city validation and correction, and street validation and correction, where available. Instep 510, Canadian NCOA is performed, if requested.

The present invention has many advantages. For first class mailers, the user's mail, such as invoices, is forwarded to new addresses when the addressees move, but having the new address in advance saves one to two weeks of delivery time. For standard class (bulk) promotions, more pieces are delivered with more accurate addresses yielding a higher response rate. For all businesses, data cleansing facilitates internal data integration efforts and generates high match rates to other data. Cost savings are realized, depending on the size of the customer list. The present invention is able to determine a correct address and match it to a unique business identifier in a database for up to 95% of the addresses determined to be uncorrectable by the U.S. Postal Service. The present invention has a database with nearly 19 million marketable U.S. business records and 14 million more in an historical repository. The present invention appends data that is about 98% ZIP+4-coded due to monthly address updating and maintenance routines. For international addresses there are about 41 million marketable records. The matcher may provide an improved address even when postal correction software is unable to.

It is to be understood that the above description is intended to be illustrative and not restrictive. Many other embodiments will be apparent to those of skill in the art upon reviewing the above description, including other systems and methods for data cleansing and other similar differences. The present invention applies to many fields where data is cleansed. Therefore, the scope of the present invention should be determined with reference to the appended claims, along with the full scope of equivalents to which such claims are entitled.

What is claimed is:

1. A method for data cleansing, comprising:
receiving an input postal address and a DUNS number;
comparing said input postal address to a standard;
providing a single best postal address derived from said input postal address, based on said comparison;
matching said DUNS number and said single best postal address to a database having DUNS numbers associated with postal addresses, to find a matching postal address in said database; and
correcting said input postal address based on said matching postal address.

2. The method according to claim 1, wherein said database is an advanced office system (AOS).

3. The method according to claim 1, further comprising:
providing a match project analysis report.

4. The method according to claim 1, further comprising:
converting said input postal address to a predetermined record layout, before comparing said input postal address to said standard.

5. The method according to claim 1, further comprising:
associating said input postal address with a code, said code being used to determine said single best postal address.

6. The method according to claim 1, further comprising:
associating said input postal address with a score, said score being used to determine said single best postal address.

7. The method according to claim 1, wherein said standard is selected from the group consisting of: ZIP+4 coding, coding accuracy support system (CASS), Locatable Address Conversion System (LACS), delivery sequence file (DSF), and National Change of Address (NCOA).

8. The method according to claim 1, further comprising:
sending a status notification to a user who supplied said input postal address.

9. A computer implemented system for data cleansing, comprising:
a pre-auditor that generates a report having a plurality of views of an input address file, said input address file including a record having an input postal address and a DUNS number;
a verifier that finds and removing any invalid records from said input address file;
a vendor interface that sends said input address file and an order to a vendor, and receives a file of standardized postal addresses from said vendor;
a component that compares said input postal address to said standardized postal addresses;
a component that provides a single best postal address derived from said input postal address, based on said comparison;
a matcher that matches said DUNS number and said single best postal address to a database having DUNS numbers associated with postal addresses, to find a matching postal address in said database; and a component that corrects said input postal address based on said matching postal address.

10. The system according to claim 9, further comprising:
an investigator that investigates any address not matched, upon request.

11. The system according to claim 9, wherein said plurality of views includes a view selected from the group consisting of: alphabetical, most frequent content, and alpha characters only.

12. The system according to claim 9, wherein said vendor standardizes postal addresses using at a process selected from the group consisting of: Locatable Address Conversion System (LACS), delivery sequence file (DSF), and National Change of Address (NCOA).

13. A machine readable medium having instructions stored thereon to perform a method for data cleansing, comprising:

receiving an input postal address and a DUNS number;

comparing said input postal address to a standard;

providing a single best postal address derived from said input postal address based on said comparison;

matching said DUNS number and said single best postal address to a database having DUNS numbers associated with postal addresses, to find a matching postal address in said database; and correcting said input postal address based on said matching postal address.

* * * * *